(12) United States Patent
Brües et al.

(10) Patent No.: US 12,187,253 B2
(45) Date of Patent: Jan. 7, 2025

(54) PEDAL SENSOR

(71) Applicant: Hella GmbH & Co. KGaA, Lippstadt (DE)

(72) Inventors: Heinrich-Reinhold (Heinz) Brües, Geseke (DE); Kristin Gees, Lippstadt (DE); Ali Kemal Kücükyavuz, Bielefeld (DE); Sascha Kuhlmann, Geseke (DE); Ahmet Özcapci, Lippstadt (DE); Ruben Pella, Geseke (DE); Lothar Rehage, Rheda-Wiedenbrueck (DE); Ralf Ridder, Lippstadt (DE); Claus Viethen, Erwitte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 202 days.

(21) Appl. No.: 17/812,618

(22) Filed: Jul. 14, 2022

(65) Prior Publication Data

US 2022/0348170 A1 Nov. 3, 2022

Related U.S. Application Data

(63) Continuation of application No. PCT/EP2021/051985, filed on Jan. 28, 2021.

(30) Foreign Application Priority Data

Feb. 13, 2020 (DE) ...................... 10 2020 103 801.1

(51) Int. Cl.
*B60T 7/04* (2006.01)
*B60T 8/40* (2006.01)
*G05G 1/38* (2008.04)

(52) U.S. Cl.
CPC .............. *B60T 7/042* (2013.01); *B60T 8/409* (2013.01); *G05G 1/38* (2013.01); *B60T 2220/04* (2013.01)

(58) Field of Classification Search
CPC ........................... B60T 7/042; B60T 2220/04
See application file for complete search history.

(56) References Cited

U.S. PATENT DOCUMENTS 6,467,369 B1 * 10/2002 Mann .................... B60K 26/021
                                                                                                        74/513
2004/0040403 A1 * 3/2004 Hayashihara .......... G05G 1/405
                                                                                                        74/512

(Continued)

FOREIGN PATENT DOCUMENTS

| DE | 10315589 A1 | 10/2004 |
| DE | 102004051888 A1 | 5/2006 |
| DE | 102011051406 A1 | 1/2013 |

*Primary Examiner* — Long T Tran
(74) *Attorney, Agent, or Firm* — Husch Blackwell LLP

(57) ABSTRACT

A pedal sensor is provided with a carrier that can be mounted to a motor vehicle. A housing is formed at the carrier, and a pedal arm is mounted on the carrier so as to be pivotable. A mechanism to transmit movements of the pedal arm relative to the carrier is arranged in the housing, and a sensor for measuring the movements is provided. A damping element is fixed to the carrier in a groove in such a way that any contact between the pedal arm and the carrier is dampened. The damping element is securely held on the carrier. This is achieved by the damping element being secured on both sides against slipping out of the groove.

5 Claims, 2 Drawing Sheets

(56) References Cited

U.S. PATENT DOCUMENTS

| | | | | |
|---|---|---|---|---|
| 2010/0077886 A1* | 4/2010 | Seiltz | ............... | G05G 1/38 |
| | | | | 74/513 |
| 2014/0090512 A1* | 4/2014 | Kaijala | ............ | G05G 1/44 |
| | | | | 74/514 |
| 2014/0305255 A1* | 10/2014 | Min | ............... | G05G 5/03 |
| | | | | 74/512 |

* cited by examiner

PEDAL SENSOR

CROSS REFERENCE

This application claims priority to PCT Application No. PCT/EP2021/051985, filed Jan. 28, 2021, which itself claims priority to German Application No. 10 2020 103801.1, filed Feb. 13, 2020, the entirety of both of which are hereby incorporated by reference.

FIELD OF THE INVENTION

The invention relates to a pedal sensor comprising a carrier that can be mounted to a motor vehicle where a housing is formed at the carrier, a pedal arm that is mounted on the carrier so as to be pivotable, where a mechanism to transmit movements of the pedal arm relative to the carrier is arranged in the housing and a sensor for measuring the movements, and a damping element that is fixed to the carrier in a groove in such a way that any contact between the pedal arm and the carrier is dampened.

BACKGROUND OF THE INVENTION

Such pedal sensors are, in principle, known and described, for example, in WO 2019/210945 A1. They are deployed in motor vehicles to control the output of an engine/motor by means of operation by a driver and a control device. Depending on the required rate of acceleration, the pedal arm is moved by the driver from a zero position into an operating position, where the maximum operating position (full speed) is limited by its contact with the carrier.

The invention can be deployed for motor vehicles with manual or automatic transmissions, where a kick-down element is arranged for the latter.

The way in which the pedal sensors function is generally known and consequently does not have to be explained in more detail here.

In order to achieve pleasant pedal sensor haptics for the driver and at the same time to prevent excessive noise development by the pedal arm coming into contact with the carrier, the damping element is arranged as already known. The latter is mounted to the carried in the corresponding manner. In this respect, the mounting must be permanent and of such a nature that the functioning of the pedal sensor is not restricted.

For the mounting, it is, for example, known that the damping element should be arranged in a groove made in the carrier. In this respect, it has a circular cross-section and is elongated. The groove that is open towards the pedal arm has a cross-section in the shape of a circle segment, the arc of which is larger than that of a semi-circle. According to the state of the art, the groove is closed at a first end and opened at a second opposite end. Radii of the cross-section of the damping element and the groove are essentially of the same size. For mounting, the elastic damping element is pressed into the open long side of the groove and held here in a form-locked manner. In this, respect a part of the damping element in the shape of a circle segment protrudes from the groove in the direction of the pedal arm, such that is acts a damper for contact in the full-speed position.

It is a disadvantage with the known pedal sensors that, over the course of operation, the damping element can gradually slip out of the groove through the open front side. It is not technically possible to close this front side because it must remain open to be able to pull a corresponding molded part out of an injection mold.

BRIEF SUMMARY OF THE INVENTION

Consequently, one of the tasks of the invention is to create a pedal sensor in which a damping element is securely held on a carrier.

The task is solved by the damping element being secured on both sides against slipping out of the groove. An open front side of the groove is provided with means that prevent slipping out; these means are designed in such a way that the groove as such is open at an allocated front side and consequently demolding can be performed after the carrier has been manufactured using injection molding. The damping element is secured externally specifically above the front side and thus outside the groove and at a lateral end of the damping element that protrudes from the groove. The damping element is thus secured against laterally slipping out of the groove without the manufacture of the carrier using injection molding being negatively impacted.

In one design, a bar is arranged on a front side of the groove for the purpose of securing. This requires little material and provides for correspondingly little additional weight. The functioning of the damping element is not negatively impacted.

In another design, the bar is molded as a single piece with the carrier. This simplifies the manufacturing of the carrier with the securing.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

As can be seen from the figures, an upright pedal sensor comprises a carrier 1 and a pedal arm 2.

The carrier 1 is designed to be mounted in the footwell of a motor vehicle. Integrated into the carrier, there is a housing in which a mechanism and a sensor are arranged to determine a relative position of the pedal arm 2. The mechanism serves to transmit relative movements to a transmitter and to generate forces opposing the operation of the pedal arm 2 as well as hysteresis for such forces. In this case, the sensor takes the form of an angular position sensor that registers the movements of the sensor and forwards the same to an evaluation and control device for further processing.

Figure 1:
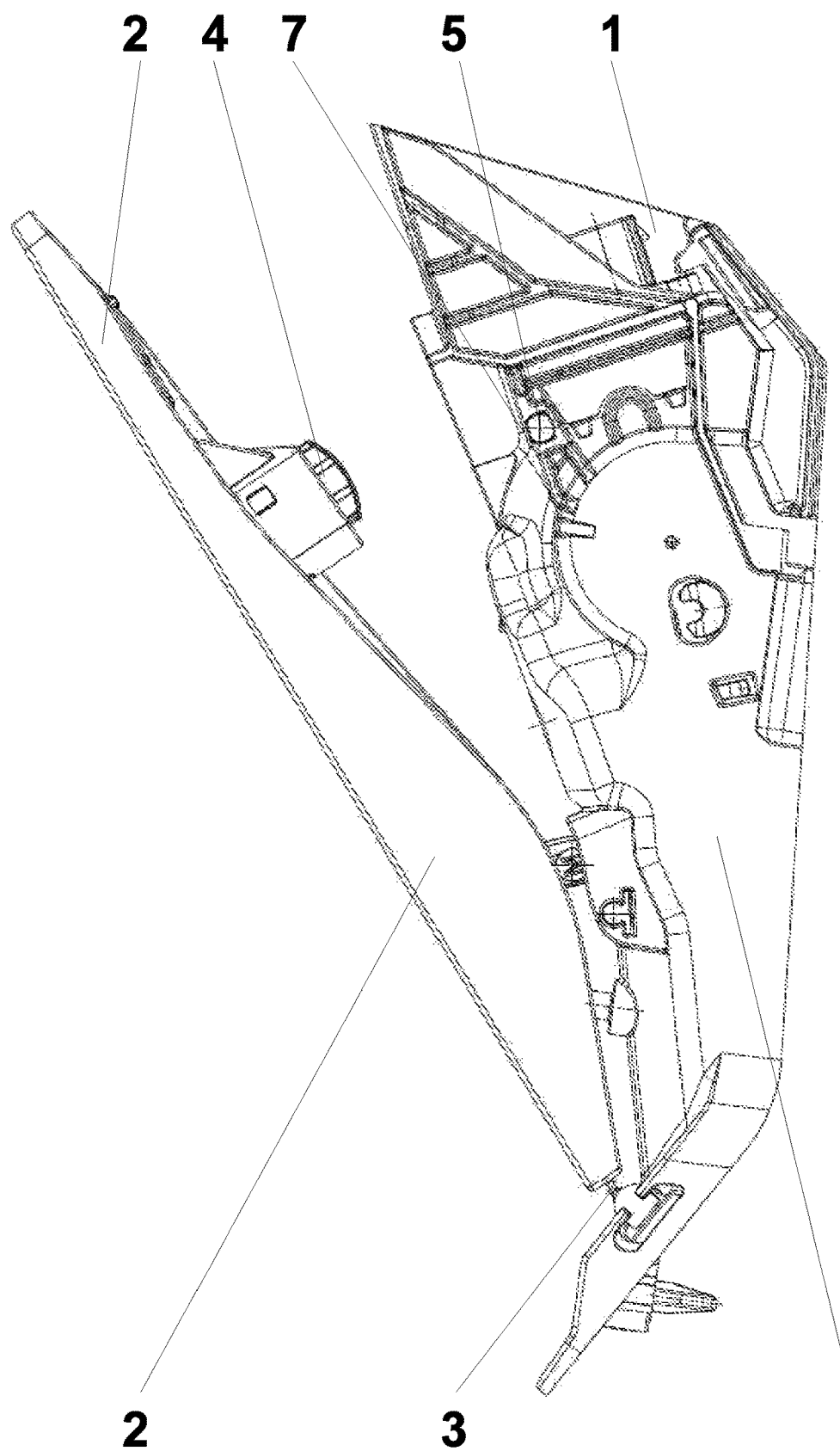
FIG. 1 is a side view of a pedal sensor.

The pedal arm 2 features an essentially flat operating side facing away from the carrier 1 and is mounted in an articulated manner on a lower end section of carrier 1 in accordance with FIG. 1. For this purpose, a film hinge 3 is molded onto the lower end of the pedal arm 2 that is mounted on the carrier 1 such that it is detachable. A rotary axis of pedal arm 2 lies vertically to a longitudinal axis of the pedal sensor in a plane parallel to the operating side. In a lower third, the pedal arm 2 is coupled to the mechanism. In an upper half of the pedal arm 2, the stop 4 is mounted in such a way that it points in the direction of the carrier 1 and protrudes from a plane of the pedal arm 2. A side of the stop 4 facing the carrier 1 is curved when viewed from the side. Optionally, the stop 4 takes the form of a kick-down element.

A damping element 5 is mounted to the carrier 1 in such a way that it comes into contact with the stop 4 when the pedal arm 2 is at full-speed position. It is arranged in parallel to the rotary axis of the pedal arm 2.

The damping element 5 takes the shape of a bar with a circular cross-section and is manufactured from an elastic material such as silicone.

Figure 3:
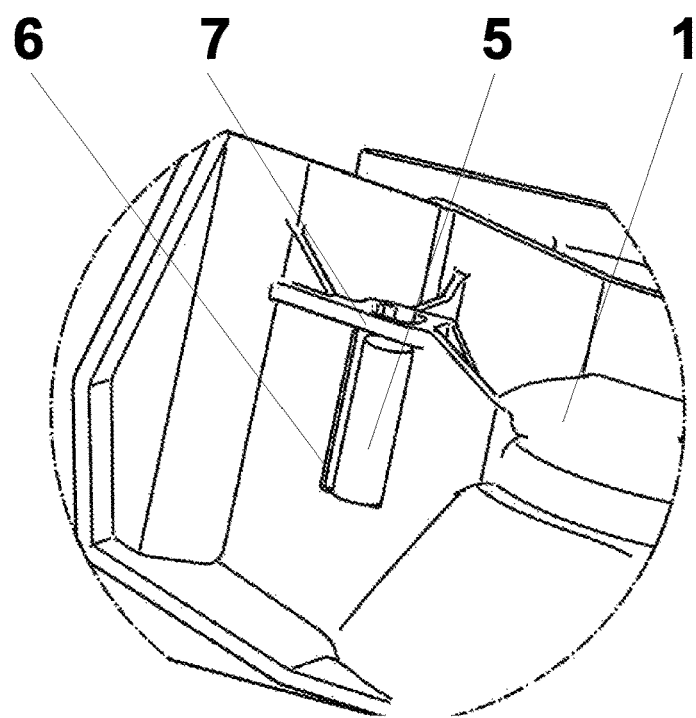
FIG. 3 is an isometric view according to FIG. 2.

For mounting the damping element 5, there is in the carrier 1 an elongated groove 6, the opening on the long side of which points towards the pedal arm 2. The groove 6 has a cross-section in the shape of a circle segment, where the circle segment is larger than a semi-circle. A diameter of the groove 6 corresponds to a diameter of the damping element 5 with a predetermined play. A first front side of the groove 6, lower according to FIG. 3, is closed whereas a second front side opposite the first one is open. The damping element 5 is held in the groove 6, where one part of the damping element 5 protrudes from the cross-section of the groove 6 and thus out of its open long side.

Figure 2:
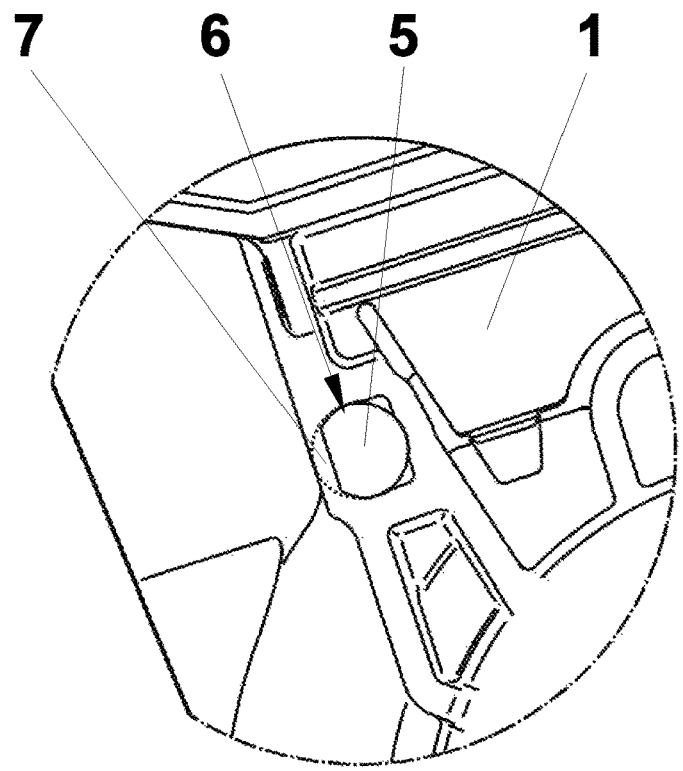
FIG. 2 is a side view of a part of a carrier of the accelerator in detail.

The second front side of the groove 6 spans a bar 7 that extends parallel to the front side and, for reasons of stability, longitudinally beyond the same. The open cross-section of the second front side is not negatively impacted (made smaller) by the bar 7, such that the molded part for the groove 6 can be pulled out of the same without problems following injection molding. The bar holds the damping element 5 laterally in an area that protrudes from the groove 6 as shown in FIG. 2 by the broken line (arc). A height of the bar 7 is dimensioned in such a way that firstly the required stability and secondly the lateral hold for the damping element 5 are ensured. The bar 7 is molded as a single piece with the carrier 1.

For mounting onto the carrier 1, the damping element 5 is pressed coaxially into the opening of groove 6 on the long side in such a way that in the cross-section a segment-shaped part of the damping element 5 protrudes from the groove 6.

LIST OF REFERENCE NUMBERS

1 Carrier
2 Pedal arm
3 Film hinge
4 Stop
5 Damping element
6 Groove
7 Bar

We claim:

1. A pedal sensor comprising:
   a carrier configured to couple with a motor vehicle;
   a pedal arm pivotally mounted on the carrier;
   a housing positioned and located on the carrier;
   a mechanism arranged in the housing, wherein the mechanism transmits movements of the pedal arm relative to the carrier;
   a sensor for measuring the movements of the pedal arm relative to the carrier;
   a groove positioned and located on the carrier, the groove having a first side and second side positioned and located opposite from one another;
   a damping element positioned and located in the groove, the damping element configured to damp contact between the pedal arm and the carrier;
   a bar positioned and located proximate to the second side of the groove; and
   wherein the damping element is retained in the groove by the bar and the first side of the groove.

2. The pedal sensor in accordance with claim 1, wherein the bar is formed as a single-piece together with the carrier.

3. The pedal sensor in accordance with claim 1, wherein a long side of the groove positioned proximate to the pedal arm is open such that the pedal arm makes contact with the damping element when the pedal arm rotates toward the carrier.

4. The pedal sensor in accordance with claim 3, further including a stop positioned and located on the pedal arm to make contact with the damping element when the pedal arm rotates toward the carrier.

5. The pedal sensor in accordance with claim 1, wherein the damping element is oriented parallel to a rotary axis of the pedal arm.

* * * * *